No. 792,849. PATENTED JUNE 20, 1905.
J. F. M. RIFFARD.
MACHINE FOR CUTTING DESIGNS ON VELVET.
APPLICATION FILED MAR. 25, 1904.

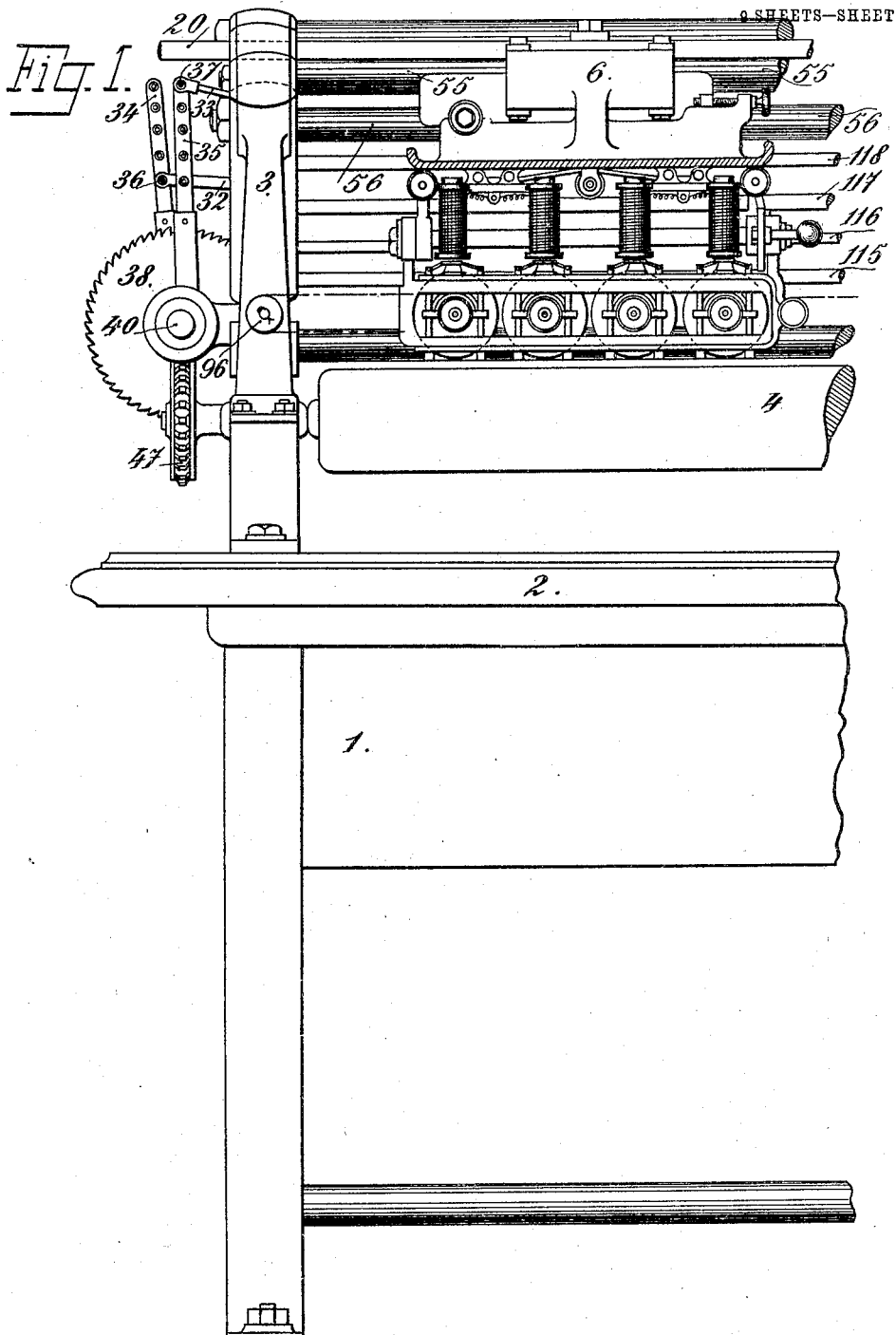

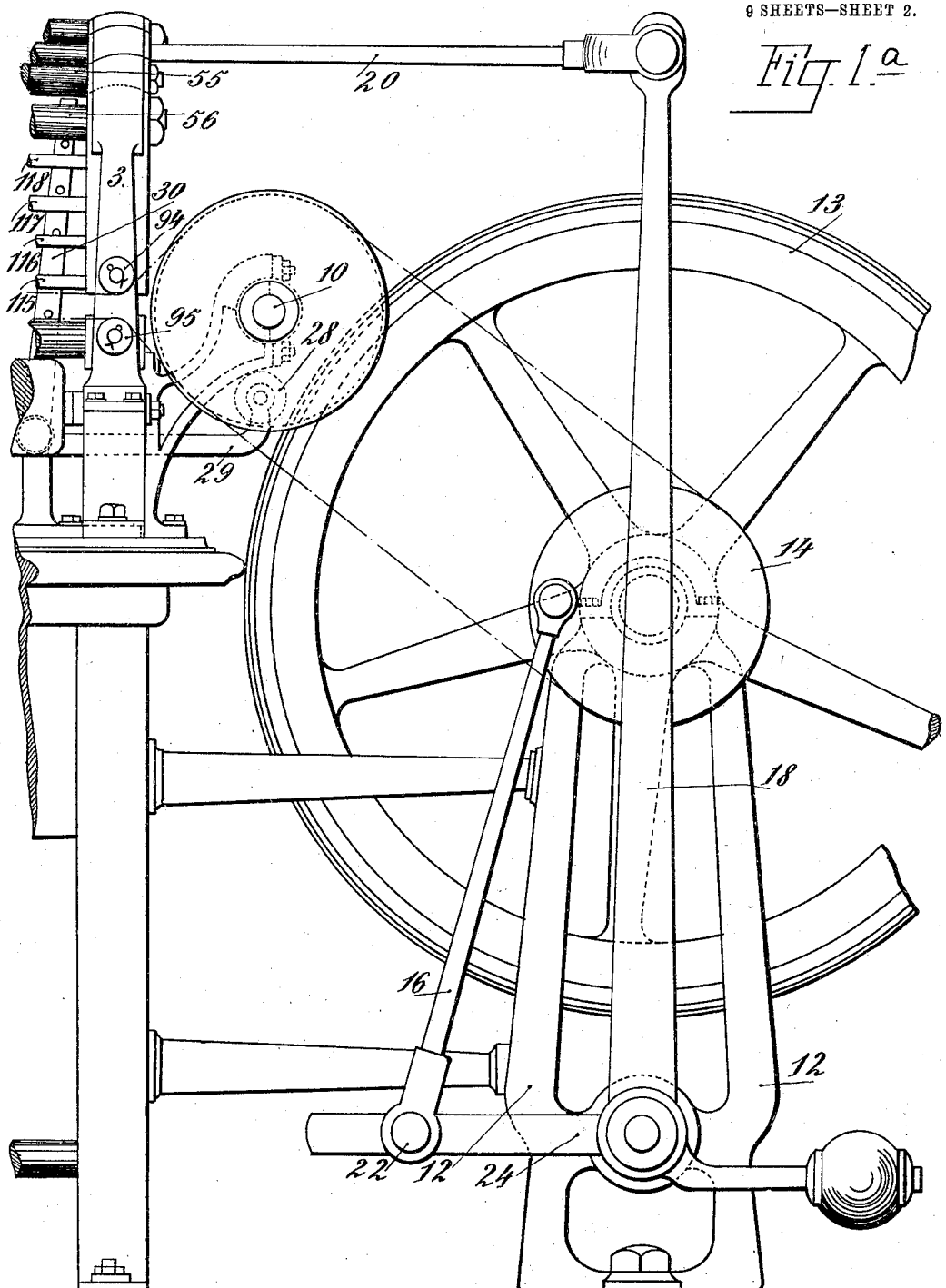

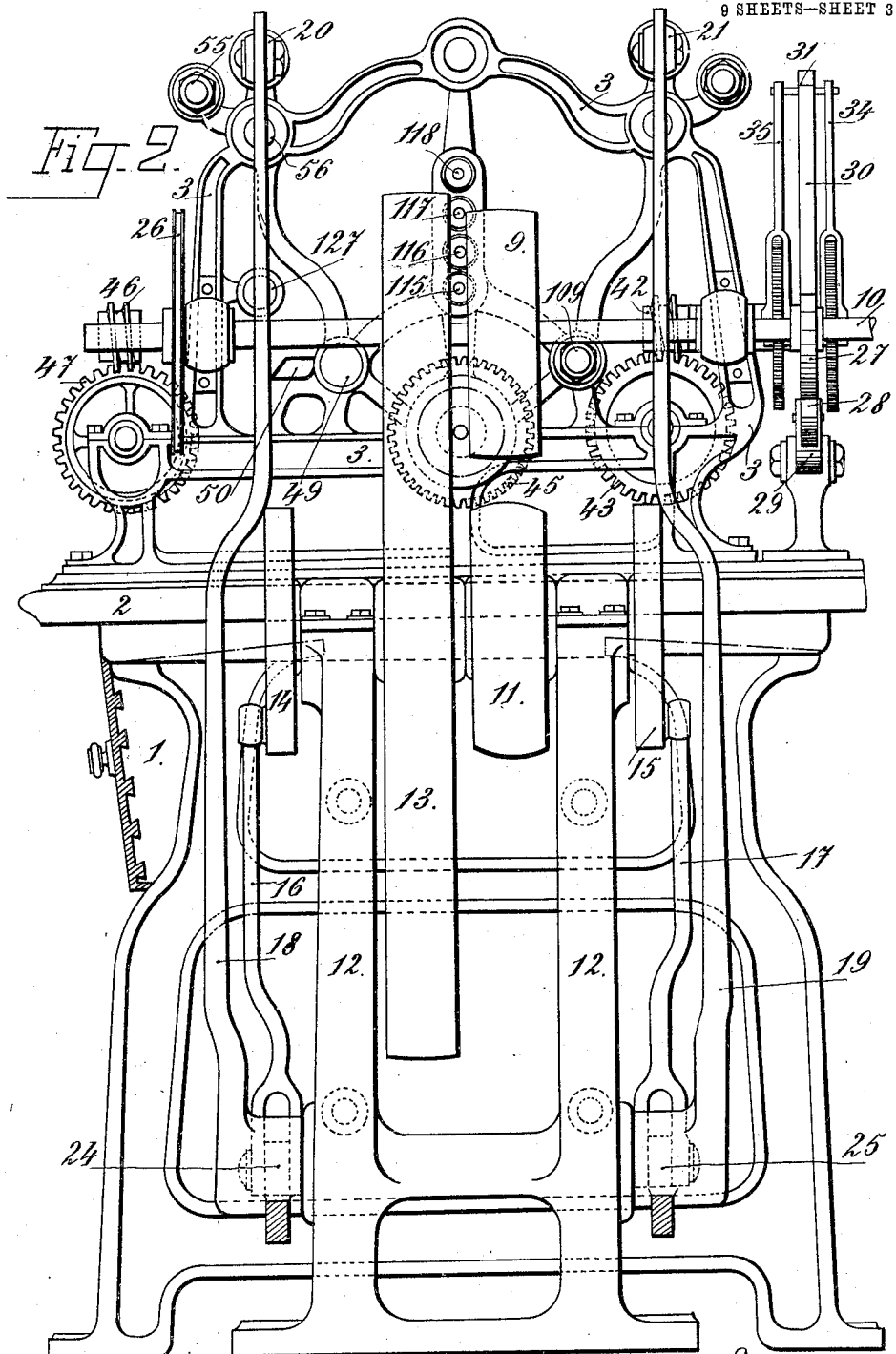

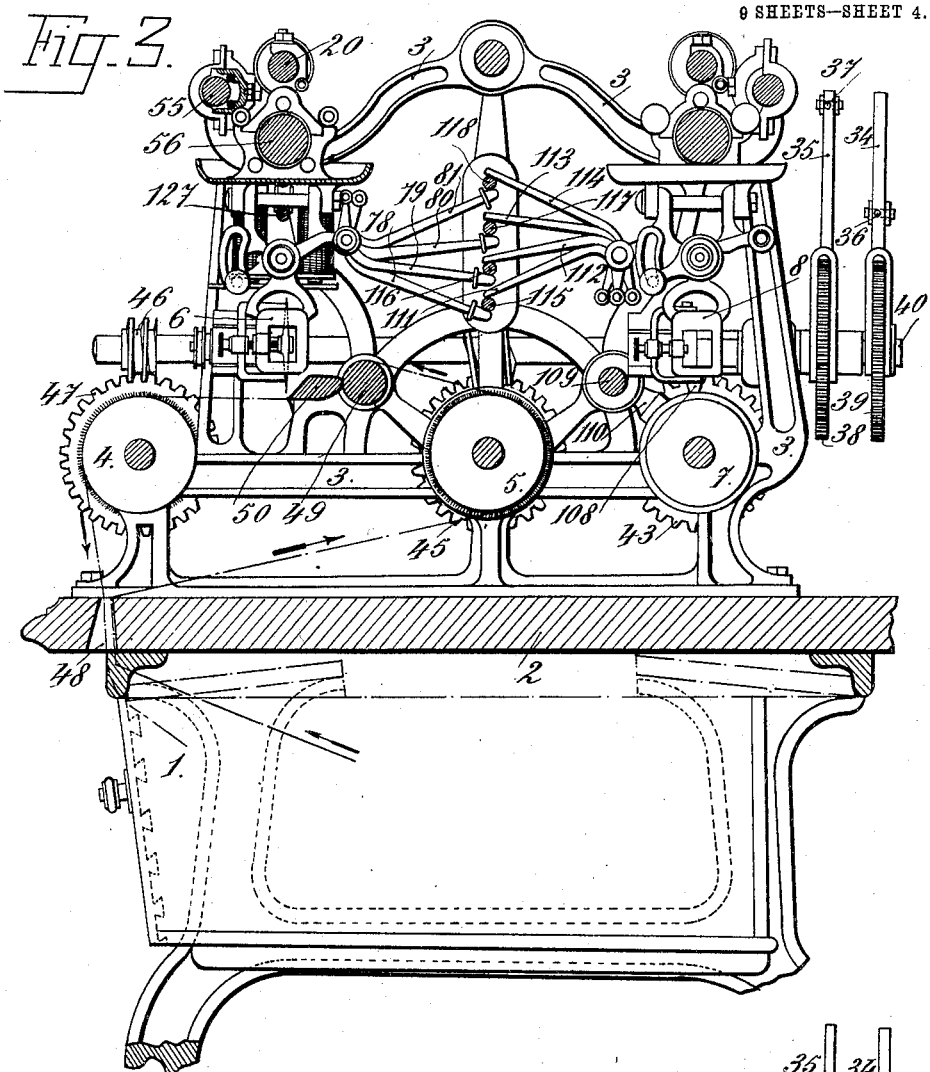

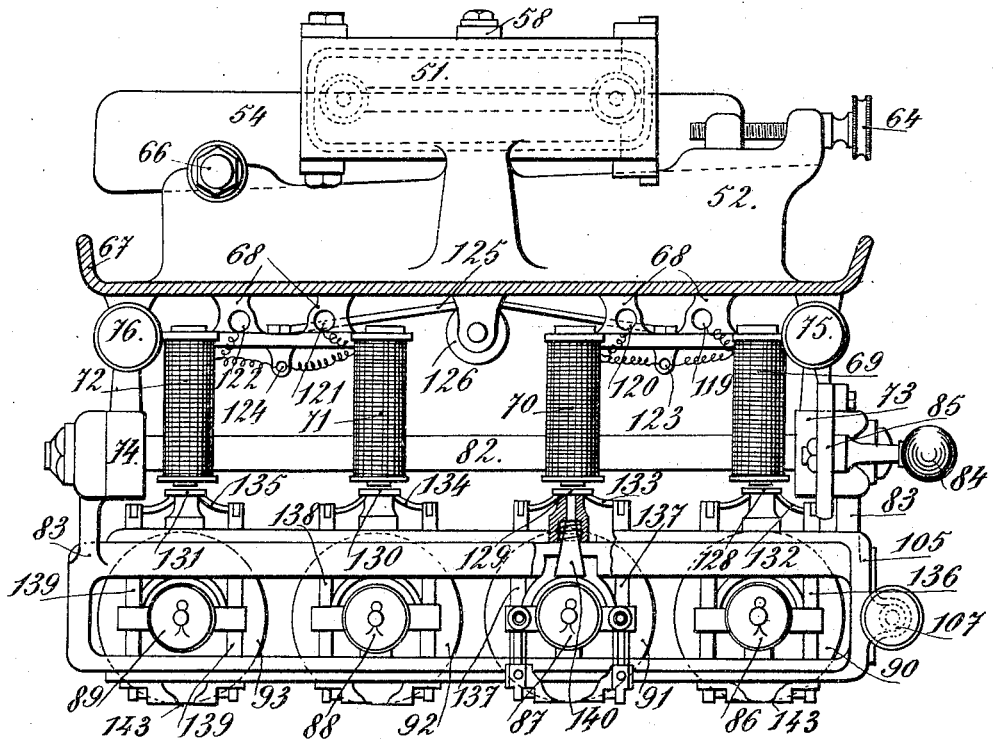

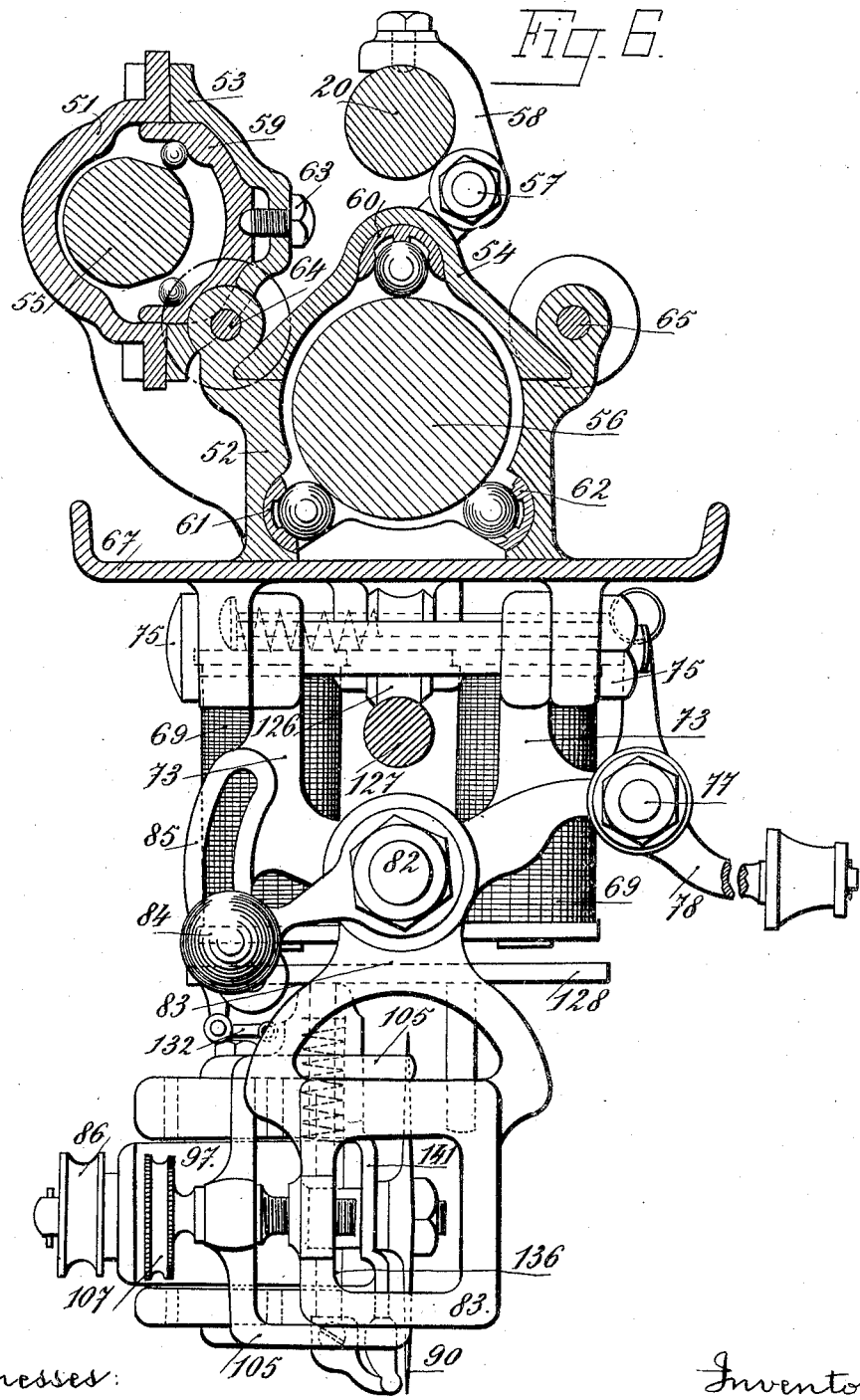

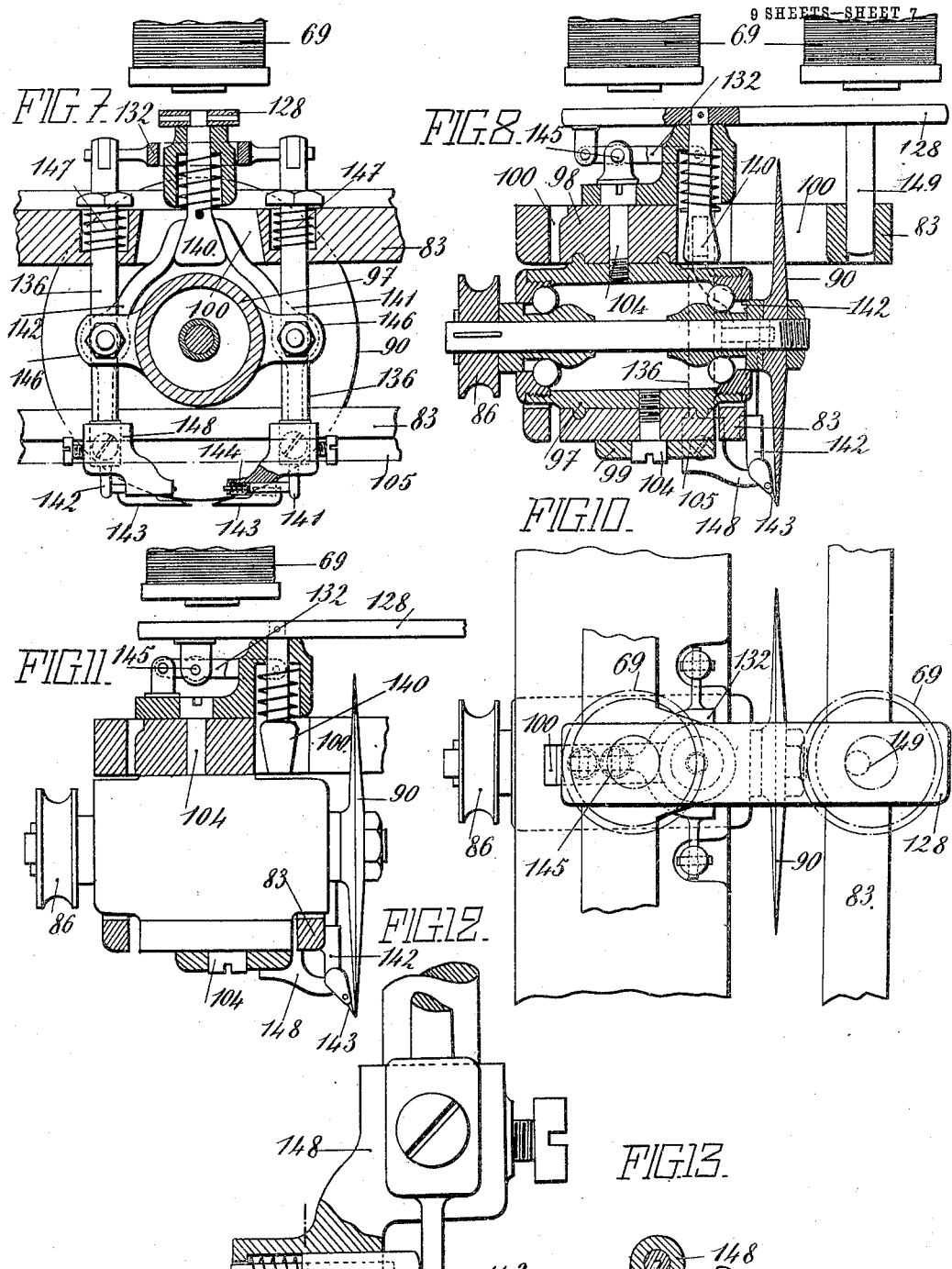

9 SHEETS—SHEET 8.

Witnesses:
E. O. Hildebrand
M. F. Anderson

Inventor:
Jean François Marien Riffard
by George Massie
Attorney

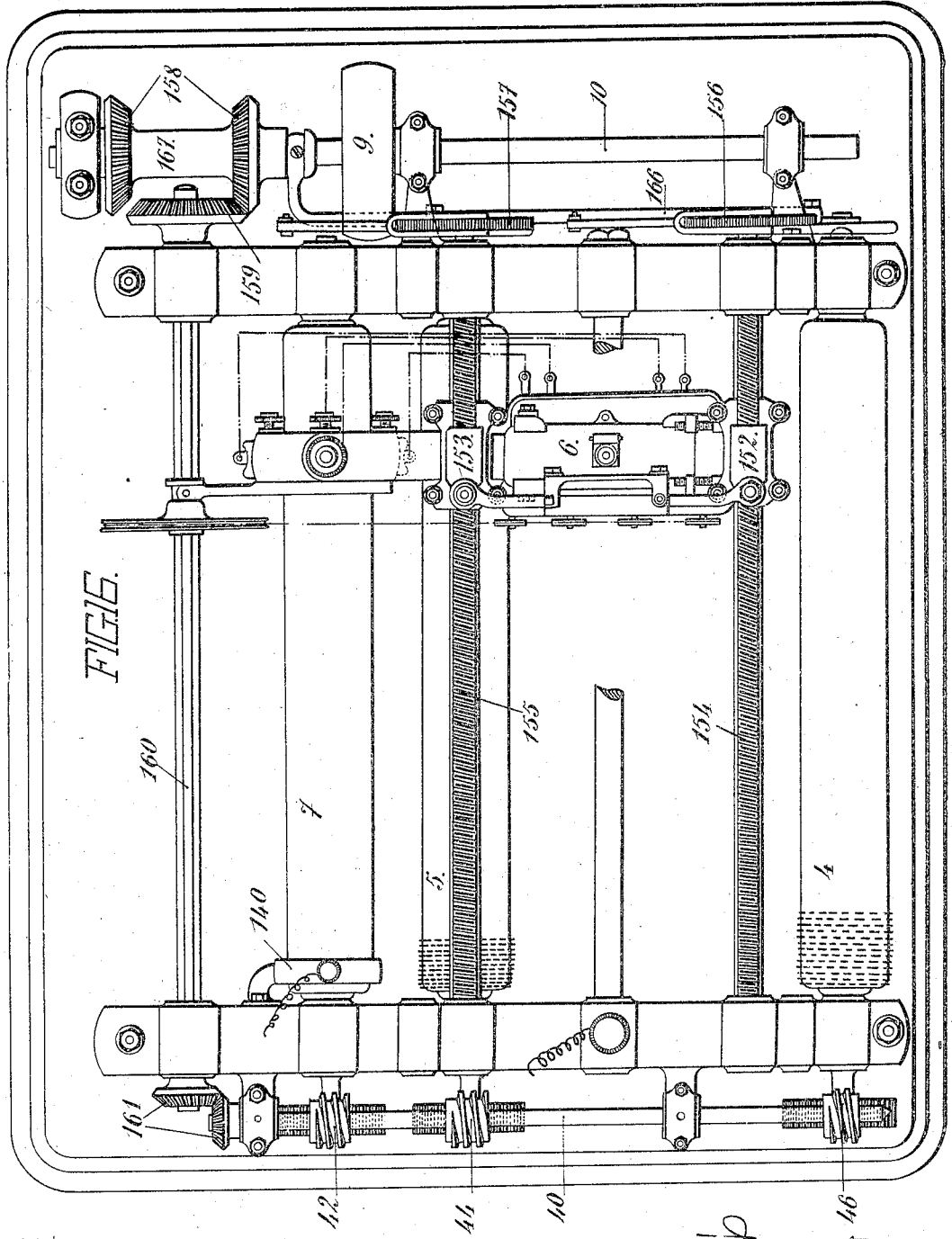

No. 792,849. Patented June 20, 1905.

UNITED STATES PATENT OFFICE.

JEAN FRANCOIS MARIEN RIFFARD, OF ST. ETIENNE, FRANCE.

MACHINE FOR CUTTING DESIGNS ON VELVET.

SPECIFICATION forming part of Letters Patent No. 792,849, dated June 20, 1905.

Application filed March 25, 1904. Serial No. 199,994.

*To all whom it may concern:*

Be it known that I, JEAN FRANCOIS MARIEN RIFFARD, residing at St. Etienne, France, have invented a new and useful Improvement in Machines for Cutting Designs on Velvet, which improvement is fully set forth in the following specification.

This invention has for its object a machine which serves to reproduce in velvet upon a special fabric called "uncut velvet" the designs with which a metal cylinder is provided.

Figure 14:
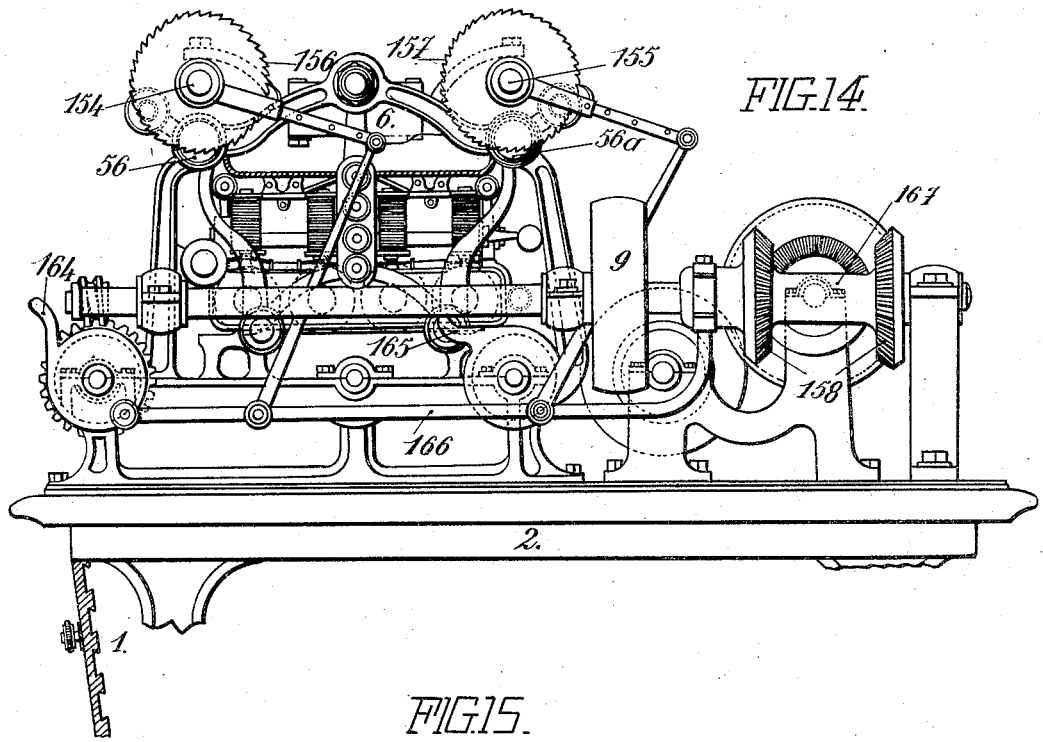
Figure 15:
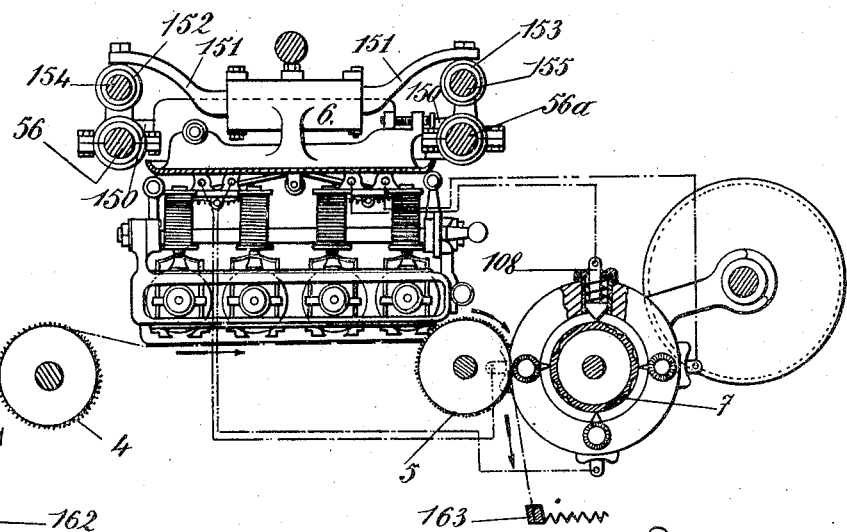

Figures 1 and 1ª show a front elevation. Fig. 2 is a side view, the slides being removed. Fig. 3 is a vertical transverse section. Fig. 4 is a side view of the slide. Fig. 5 is a plan of the same. Fig. 6 is an end view to a larger scale. Fig. 7 shows a part carried by the slide. Fig. 8 is a section on the line A A of Fig. 7. Fig. 9 shows details of actuating the machine. Fig. 10 is a plan view of the parts shown in Figs. 7 and 8. Fig. 11 shows a modified arrangement of the same parts. Figs. 12 and 13 are detail views on a still larger scale. Figs. 14, 15, and 16 show a modified apparatus for cutting Amiens velvet, in which the pile comes from the weft.

The machine consists of a box or casing 1, containing the uncut fabric, and a pedestal 2, which carries the frame 3 of the machine. The cylinders 4 and 5 draw out the fabric, which is operated upon by the slide 6. The cylinder 7 is provided with a covering, which is engraved and over which the slide 8, which electrically transmits all its movements to the slide 6, passes.

The pulley 9, mounted upon the shaft 10, is driven. It in its turn drives a pulley 11, the shaft of which is supported by uprights 12 and carries a fly-wheel 13 and two crank-plates 14 and 15. To these plates are jointed two connecting-rods 16 and 17, which act upon bent levers, the arms 18 and 19 of which give to the rods 20 and 21 a reciprocating movement. The travel of the said rods is regulated by moving the points 22 and 23, at which the connecting-rods 16 and 17 are attached to the regulating-arms 24 and 25, which form the second arms of the bent lever. The rods 20 and 21 thus transfer the movements to the slides 6 and 8. Upon the shaft 10 are also mounted a grooved pulley 26 and a cam 27, which acts by contact on an angle of five degrees per half-turn of the shaft upon a roller 28, carried by the bent lever 29 30. At a point 31 on the arm 30 are fixed, on each side of it, two rods 32 and 33, which are jointed to the levers 34 and 35 at varying points 36 and 37. The said levers 34 and 35 carry pawls, which act upon the toothed wheels 38 and 39. One, 39, of the said wheels rotates the shaft 40, upon which it is keyed. The other toothed wheel 38 is mounted upon the shaft 41, concentric with 40 and rotates it upon ball-bearings independently of 40. The shaft 41 carries a worm 42, which drives the toothed wheel 43, upon the axis of which is mounted the cylinder 7. Upon the shaft 40 are mounted two other worms, one, 44, of which gears with the wheel 45 and the other, 46, with the wheel 47. Upon the axis of the wheel 45 is fixed the cylinder 5 and upon the axis of 47 the cylinder 4. It will therefore be seen that the cylinders 4 and 5, which receive the fabric, rotate with the same speed and that the cylinder 7, which carries the engraved covering, can rotate at a different speed. In effect, according to the position of the points of attachment 36 and 37 of the rods 32 and 33 with the levers 34 and 35 the pawls will act upon the wheels 38 and 39 through a different arc.

The fabric follows the travel indicated by the arrows. It passes out of the box or casing through the opening 48, passes over the cylinder 5, the surface of which is provided with pins, then over the glass cylinder 49 beneath the regulating-plate 50, and lastly passes out of the apparatus after passing over the pin-cylinder 4. For the sake of clearness the pins are not shown in Fig. 1. The fabric is operated upon by the implement immediately after passage under the regulator 50.

The slide 6, carrying the implements, consists of a cast piece 51 and a piece 52 serving as guide. These two pieces, which are provided with caps 53 and 54, slide along the axes 55 and 56. The cap 54 carries a hinge 57, to which is jointed an arm 58, which is coupled to the rod 20, giving motion to the slide. The said hinge allows when a piece of fabric of a smaller size than the other pieces comes to hand one or more slides to be stopped without arresting the machine. The ball-races 59, 60, 61, and 62 are of cemented steel and carry balls, and a rolling movement without play is obtained by means of tightening-screws 63, 64, 65, and 66. A cast-iron trough 67 receives the excess of grease and carries the supports 68 of the electromagnets 69, 70, 71, and 72, of which there may be any suitable number. The pieces 73 and 74, fixed by screws 75 and 76, support the lower portion of the slide and also the insulated axis 77, which carries the collector-levers 78, 79, 80, and 81. The eccentric axis 82 carries the piece 83, which it connects with the pieces 73 and 74. The said axis 82 is moved by the handle 84, which slides in the slot 85, and its movement causes the lower portion carrying the cutting-tools to move upward or downward, thus allowing the cutting-tools to be pointed. The piece 83 supports the "tools," properly so called. These latter, driven by the pulleys 86, 87, 88, and 89, frictionally keyed upon their respective axes, are formed each of a circular blade 90, 91, 92, and 93. The pulleys transmit the movement of rotation to the circular blades and are themselves actuated by a driving-strap supported by the pulleys 94, 95, and 96 and driven by the grooved pulley 26. The axes common to the pulleys and to the blades are mounted upon ball-bearings—for example, in stationary bushes 97. These bushes carry guides 98 and 99, which can slide in the grooves 100, 101, 102, and 103, formed in the pieces 83, and are fixed by screws 104 in a piece 105, movable upon the vertical axis 106. This movement is caused by the screw 107, fixed to the frame 105 and passing through a screw-threaded projection on the piece 83, Figs. 5 and 6, which thus displaces the screw 104 of the guides 98 and 99, and consequently the circular blades, which will produce by the reciprocating movement of the slide four lines of cut, which lines are a distance apart, according to the fabric treated and the effects to be obtained.

The slide 8, which moves along the engraved covering on 7, is formed in an analogous manner to the slide 6; but there are no electromagnets, and the circular cutting-blades are replaced by contact-making implements 108, pressed onto the engraved covering of cylinder 7. Such implements may consist of a copper wire embedded in a non-conducting body and very slightly (if at all) projecting out of said body to make contact with the engraved covering of the cylinder 7. A current is led through the bar 109 and the friction-contact 110 to the roller 7. From thence it passes to those copper wires on the piece 108 which are in contact with conducting parts on the engraved covering upon 7. The contact-making implements 108 are electrically connected in any suitable manner with conducting-rods 111, 112, 113, and 114, which press and slide upon the copper bars 115, 116, 117, and 118, along which also move the rods 78, 79, 80, and 81, carried by the working slide and connected, respectively, with the terminals 119, 120, 121, and 122 on said slide, Fig. 4. The current thus arrives at the terminals 119, 120, 121, and 122, passing thence into the electromagnets 69, 70, 71, and 72 and to the terminals 123 and 124, then through the conducting-bar 125 and the roller 126 to the bar 127. The said bar upon which the roller 126 runs is provided with a terminal connected to the negative pole. When the current passes into one of the electromagnets, or rather into one of the pairs of electromagnets, it lifts the corresponding armature 128, 129, 130, or 131. This causes forked levers 132, 133, 134, and 135 to oscillate, which are pivoted, as at 145, on the frame 105, Figs. 8 and 10, and are connected at the ends nearest the circular blades with vertical rods 136 137 138 139, guided through openings in the parts 83 and in projections 146 on both sides of the bushes 97. Springs 147, located on each of the rods 136 to 139, bring them back to their initial position after they have been operated by the forked levers. On the lower ends of the rods 136 to 139 are secured head-pieces 148, Figs. 7, 8, and 11, in which needle-blades 143 are adapted to slide. The two needles 143, corresponding to one and the same circular blade, can be pushed toward each other by the lower ends of bent levers 141 and 142, pivoted on the lateral projections 146 of the bushes 97, after which they are brought back to their initial positions by means of helical springs 144, suitably arranged. When the armature, which is guided in its movement by a vertical rod 149, extending through an opening of part 83, is attracted, it raises the cone 140, which is attached to it, and thus separates the bent pieces 141 and 142, the lower ends of which act upon the needles 143, held by the helical spring 144, and cause them to pass out of their sheath in the head-pieces 148. It will thus be seen that when the armature is attracted the needles 143 are pressed down and toward each other simultaneously, or practically so, according to the profile of the cam 140, which in the drawings is shown as a cone. The fabric properly straightened by the regulator 50 passes under the circular knives. The points of the engraved covering upon 7, which make contact with the pieces 108, allow a current to pass, which acts upon the corresponding armature of the cutting implement. The needles 143 bury themselves under the upper threads of the fabric and lift them. The circular blades 90, 91, 92, and 93 cut them. The thickness of the fabric remaining is constant whatever may be the inequalities of thickness of the original fabric, because of the unalterable thickness between the bottom of the fabric and the needle which raises the surface.

It will be understood from the foregoing description that with the arrangement shown in Figs. 8 and 10 the velvet will be cut only in the parts corresponding to relief or conducting portions on the covering of roller 7, the other portions of the fabric remaining uncut. It is equally obvious that the reverse result would be obtained by turning the conical cam 140 with the smaller end downward and so pivoting the forked levers 132 to 135 that their points of attachment with the armatures and with the rods 136 to 139 are on the same side of the axis, as shown in Fig. 11. Consequently my apparatus allows of reproducing upon the fabric either in intaglio or in relief the design engraved upon the covering of 7.

This machine allows of amplifying or diminishing the design to be reproduced by easily regulating the travel of the connecting-rods 18 and 19 and the speeds of rotation of the cylinders 7 and 4 5. The engraved cylinder-coverings may be changed as desired.

Any uncut velvet may be used, (silk, wool, and light cotton or shoddy.) The production is from three hundred meters of figured or plain velvet in ten working hours per shift.

For Amiens velvet, the pile coming from the weft and not from the warp, the slide 6 is mounted upon transverse arms 150 and 151, fitting in the bushes 51 52, which in the apparatus for cutting ordinary velvet slide on the rods 55 and 56 and provided at either end with sleeves sliding upon the axes 56 and 56ª, serving as guides, and with screw-threaded nuts 152 and 153 for imparting motion to the slide. The cylinders 4, 5, and 7 preserve their original position. The bent levers 18 24 and 19 25 and their actuating mechanism will be stopped and the rods 20 and 21 taken away, or the upright 12 and all the parts supported thereby may be done away with altogether. Two long screws 154 155, screwing into the nuts 152 and 153 and replacing the rods 20 and 21, will intermittently cause the slide 6 to advance by means of ratchets 156 and 157. The pulley 9 will give a continuous rotary movement to the shaft 10, and thereby by means of an inverting-gear 158 159, shaft 160, and angle-gearing 161 to the shaft 40, which in turn actuates the cylinders 4, 5, and 7 by means of the worms 42, 44, and 46. Rods 162 and 163, fixed to each of the ends of the fabric, will strike against a movable stop 164 or 165, causing the ratchets 156 and 157 to advance and operating the inverting-gear, thus giving a movement inverse to the winding of the fabric and reciprocally. An alternating movement of rolling and unrolling will then ensue, during the duration of which the cutting implements will pass over the whole length of the piece.

I claim—

1. A machine for cutting designs on velvet, comprising means for carrying the velvet, a cutter movable relative to the velvet, an electromagnet controlling the cutting operation, a design-pattern, a contact-tool arranged to close a circuit through the electromagnet, and means for moving the tool over the face of the pattern, whereby the cutter will operate to intermittently transfer the design to the velvet.

2. A machine for cutting designs on velvet, comprising means for carrying the velvet, a plurality of cutters moving relative to the velvet, electromagnets controlling the cutting operation, a design-pattern, contact-tools corresponding in number to the cutters and arranged to close a circuit through the electromagnets, and means for moving the tools over the face of the pattern, whereby the cutters will intermittently operate to transfer the design to the velvet.

3. A machine for cutting designs on velvet, comprising feed-rolls carrying the velvet, a cutter, means for reciprocating the cutter transversely of the velvet, a design-pattern, a contact-tool, means for reciprocating the tool over the face of the pattern, an electromagnet controlling the cutting operation, an electric connection through the design-pattern, the contact-tool and the electromagnet, whereby the passage of the tool over the face of the pattern will operate to intermittently transfer the design to the velvet.

4. A machine for cutting designs on velvet, comprising feed-rolls carrying the velvet, a plurality of cutters, means for reciprocating the cutters transversely of the velvet, a design-pattern in relief, contact-tools corresponding in number to the cutters, means for reciprocating the tools over the face of the pattern, electromagnets controlling the cutting operation, and an electric connection through the design-pattern, the contact-tools and the electromagnets, whereby the passage of the tools over the face of the pattern will operate to intermittently transfer the design to the velvet.

5. A machine for cutting designs on velvet, comprising feed-rolls carrying the velvet, a cutter, a design-cylinder, a contact-tool, an electromagnet controlling the cutting operation, an electric connection through the design, the tool and the magnet, and means for rotating the feed-rolls and the cylinder, whereby the passage of the contact-tool over the face of the design-cylinder will operate to intermittently transfer the design to the velvet.

6. A machine for cutting designs on velvet, comprising feed-rolls for carrying the velvet, a plurality of cutters, a design-cylinder, contact-tools corresponding in number to the cutters, electromagnets controlling the cutting operation, an electric connection through the design, the tools and the magnets, and means for rotating the feed-rolls and the cylinder independently at varying speeds, whereby the passage of the contact-tools over the face of the design-cylinder will operate to intermittently transfer the design to the velvet reduced or amplified as may be desired.

7. A machine for cutting designs on velvet, comprising feed-rolls carrying the velvet, rotary cutters, means for reciprocating the cutters transversely of the velvet, means for presenting the uncut pile to the cutters, electromagnets arranged to operate said means, a cylinder carrying upon its face a design in relief, contact-tools corresponding in number to the cutters, means for reciprocating the contact-tools over the face of the design-cylinder, and an electric connection through the design-cylinder, the tools and the electromagnets, whereby the passage of the tools over the design will intermittently cause the presentation of the uncut pile to the cutters and transfer the design to the velvet.

8. A machine for cutting designs on velvet, comprising feed-rolls carrying the velvet, a series of rotary cutters, a slide carrying the cutters, means for reciprocating the slide, needles carried by the slide for presenting the uncut pile to the cutters, electromagnets carried by the slide, means carried by the armatures of the magnets and serving to bring the needles into operation, a cylinder carrying upon its surface a design in relief, a series of contact-tools corresponding in number to the cutters, a slide carrying the tools, means for reciprocating the slide with the tools in contact with the face of the design-cylinder, and electric connections through the design-cylinder, the contact-tools and the electromagnets, whereby the passage of the contact-tools over the design will intermittently cause the needles to present the uncut pile to the cutters and transfer the design to the velvet.

9. A machine for cutting designs on velvet, comprising feed-rolls carrying the velvet, a series of cutters, a slide carrying the cutters, means for reciprocating the slide, needles carried by the slide for presenting the uncut pile to the cutters, levers bearing against the needles, electromagnets carried by the slide, a wedge-surface carried by the armature of each magnet and serving to actuate the levers to bring the needles into operation, a cylinder carrying upon its surface an engraved design, a series of contact-tools corresponding in number to the cutters, a slide carrying the tools, means for reciprocating the slide with the tools in contact with the face of the design-cylinder, and an electric connection through the design-cylinder, the contact-tools and the electromagnets, whereby the passage of the contact-tools over the design will intermittently energize the magnets and cause the needles to present the uncut pile to the respective cutters and transfer the design to the velvet.

10. A machine for cutting designs on velvet, comprising feed-rolls carrying the velvet, a series of rotary cutters, a slide carrying the cutters, means for reciprocating the slide, needles carried by the slide for presenting the uncut pile to the cutters, levers bearing against the needles, electromagnets carried by the slide, a wedge-surface carried by the armature of each magnet and serving to actuate the levers to bring the needles into operation, a cylinder carrying upon its surface a relief-design a series of contact-tools corresponding in number to the cutters, a slide carrying the tools, means for reciprocating the slide with the tools in contact with the face of the design-cylinder, and an electric connection through the design-cylinder, the contact-tools and the electromagnets, whereby the passage of the contact-tools over the design will intermittently energize the magnets and cause the needles to present the uncut pile to the respective cutters and transfer the design to the velvet, in combination with means for rotating the feed-rolls and the design-cylinder independently and at varying speeds whereby the transferred design may be reduced or amplified at will.

11. A machine for cutting designs on velvet, comprising feed-rolls carrying the velvet, a series of rotary cutters, a slide carrying the cutters, means for reciprocating the slide transversely over the velvet, electromagnets carried by the slide and corresponding in number to the cutters, reciprocating needles arranged adjacent to the cutters, levers having one arm bearing against the needles, a wedge-surface carried by the armature of each magnet and engaging with the other arm of the levers, a cylinder having upon its face an engraved design, a series of contact-tools corresponding in number to the cutters, a slide carrying the tools, means for reciprocating the slide with the tools in contact with the face of the design, and an electric connection through the cylinder, the contact-tools and the electromagnets whereby the passage of the contact-tools over the face of the design will intermittently energize the magnets and cause the reciprocation of the needles presenting the uncut pile to the cutters and transfer the design from the cylinder to the velvet.

12. A machine for cutting designs on velvet, comprising feed-rolls carrying the velvet, a series of rotary cutters, a slide carrying the cutters, means for reciprocating the slide transversely over the velvet, electromagnets carried by the slide and corresponding in number to the cutters, reciprocating needles arranged adjacent to the cutters, levers having one arm bearing against the needles, a wedge-surface carried by the armature of each magnet and engaging with the other arm of the levers, a cylinder having upon its face an engraved design, a series of contact-tools corresponding in number to the cutters, a slide carrying the tools, means for reciprocating the slide with the tools in contact with the face of the design, and an electric connection through the cylinder, the contact-tools and the electromagnets, whereby the passage of the contact-tools over the face of the design will intermittently energize the magnets and cause the reciprocation of the needles presenting the uncut pile to the cutters and transfer the design from the cylinder to the velvet, in combination with means for independently rotating the feed-rolls and design-cylinder step by step to a different degree, whereby the transferred design may be reduced or amplified at will.

13. A machine for cutting designs on velvet, comprising feed-rolls carrying the velvet, a series of rotary cutters arranged approximately in the same plane, bearings for the cutters, a frame adjustably supporting the bearings, an arm engaging with the bearings and pivotally mounted at one end to the frame, means for adjustably displacing the other end of the arm, a slide carrying the frame and cutters, means for reciprocating the slide transversely of the velvet, electromagnets corresponding in number to the cutters and controlling their operation, a cylinder having upon its face a design in relief, contact-tools corresponding in number to the cutters, a slide carrying the tools, means for reciprocating the slide with the tools in contact with the face of the design, and an electric connection through the design-cylinder, the tools and the cutters, whereby the passage of the tools over the design will intermittently operate the cutters and transfer the design to the velvet.

14. A machine for cutting designs on velvet, comprising feed-rolls carrying the velvet, a series of rotary cutters arranged approximately in the same plane, bearings for the cutters, a frame adjustably supporting the bearings, an arm engaging with the bearings and pivotally mounted at one end to the frame, means for adjustably displacing the other end of the arm, a slide carrying the frame and cutters, means for reciprocating the slide transversely of the velvet, electromagnets corresponding in number to the cutters and controlling their operation, a cylinder having upon its face a design in relief, contact-tools corresponding in number to the cutters, a slide carrying the tools, means for reciprocating the slide with the tools in contact with the face of the design, and an electric connection through the design-cylinder, the tools and the cutters whereby the passage of the tools over the design will intermittently operate the cutters and transfer the design to the velvet, in combination with means for rotating the feed-rolls and the design-cylinder independently and at varying speeds whereby the transferred design may be reduced or amplified at will.

15. A machine for cutting designs on velvet, comprising feed-rolls carrying the velvet, a plurality of rotary cutters arranged in approximately the same plane, bearings for the cutters, a frame adjustably supporting the bearings, an arm engaging the bearings and pivotally mounted at one end of the frame, means for displacing the other end of the arm, a slide carrying the slide, electromagnets for reciprocating the slide and corresponding in carried by the slide, electromagnets number to the cutters, reciprocating needles arranged adjacent to the cutters and serving to present the uncut pile thereto, levers having one arm bearing against the needles, a wedge-surface carried by the armature of each magnet and arranged to engage the other arm of the levers, a cylinder having upon its surface an engraved design, contact-tools corresponding in number to the magnets, a slide carrying the tools, means for reciprocating the slide with the tools in contact with the face of the design, and an electric connection through the design, the tools and the electromagnets, whereby the passage of the tools over the face of the design will intermittently cause the reciprocation of the needles and transfer the design to the velvet.

16. A machine for cutting designs on velvet, comprising feed-rolls carrying the velvet, a plurality of rotary cutters arranged in approximately the same plane, bearings for the cutters, a frame adjustably supporting the bearings, an arm engaging the bearings and pivotally mounted at one end of the frame, means for displacing the other end of the arm, a slide carrying the frame and cutters, means for reciprocating the slide, electromagnets carried by the slide and corresponding in number to the cutters, reciprocating needles arranged adjacent to the cutters and serving to present the uncut pile thereto, levers having one arm bearing against the needles, a wedge-surface carried by the armature of each magnet and arranged to engage the other arm of the levers, a cylinder having upon its surface an engraved design, contact-tools corresponding in number to the magnets, a slide carrying the tools, means for reciprocating the slide with the tools in contact with the face of the design, and an electric connection through the design, the tools and the electromagnets whereby the passage of the tools over the face of the design will intermittently cause the reciprocation of the needles and transfer the design to the velvet, in combination with means for independently rotating the feed-rolls and design-cylinder step by step to a different degree, whereby the transferred design may be reduced or amplified at will.

17. A machine for cutting designs on velvet, comprising feed-rolls carrying the velvet, a plurality of rotary cutters arranged in approximately the same plane, bearings for the cutters, a frame adjustably supporting the bearings, an arm engaging the bearings and pivotally mounted at one end to the frame, a thumb-screw for displacing the other end of the arm, a slide carrying the frame and cutters, electromagnets carried by the slide and corresponding in number to the cutters, spring-pressed reciprocating needles adjacent to the cutters and arranged to present the uncut pile thereto, levers having one arm bearing against the needles, a wedge-surface carried by the armature of each magnet and arranged to engage the other arm of the levers, a cylinder having upon its face a design in relief, contact-tools corresponding in number to the magnets, a slide carrying the tools, means for reciprocating the slide with the tools in contact with the face of the design, and an electric connection through the design, the tools and the electromagnets, whereby the passage of the tools over the face of the design will intermittently cause the reciprocation of the needles and transfer the design to the velvet, in combination with means for rotating the feed-rolls and the design-cylinder step by step and to a varying extent whereby the transferred design may be reduced or amplified at will.

18. A machine for cutting designs on velvet, comprising feed-rolls carrying the velvet, a plurality of cutters, means for reciprocating the cutters transversely of the velvet, electromagnets corresponding in number to the cutters and controlling the cutting operation, a design-pattern, contact-tools corresponding in number to the magnets, means for reciprocating the tools over the face of the pattern, rods extending parallel to the line of travel of the cutters and tools, contact conductor-arms connecting each of the tools with a rod, contact collector-arms connecting each of the rods with a magnet, and an electric circuit through the pattern, tools, arms, rods and magnets, whereby the passage of the tools over the face of the pattern will operate to intermittently transfer the design to the velvet.

19. A machine for cutting designs on velvet, comprising feed-rolls carrying the velvet, a plurality of cutters, electromagnets corresponding in number to the cutters and controlling the cutting operation, slides carrying the magnets and cutters, a cylinder having upon its face a design in relief, contact-tools corresponding in number to the cutters, and arranged to close the circuit through the magnets, a slide carrying the tools in contact with the face of the design, a drive-shaft, cranks driven thereby, angle-levers having one arm adjustably connected with the crank, a connection between the other end of the angle-levers and the slides, a shaft geared to the feed-rolls, another shaft geared with the design-cylinder, ratchet-wheels carried by the shafts, pawls carried by levers and arranged to operate the ratchets, and independently-adjustable connections between the pawl-levers and mechanism driven intermittently by the drive-shaft whereby the intermittent movement of the feed-rolls and design-cylinder may be independently regulated, and the extent of reciprocation of the slides may be varied independently, in combination with an electric circuit through the tools and the electromagnets whereby the passage of the contact-tools over the face of the design will operate to intermittently transfer the design to the velvet reduced or amplified at will.

20. A machine for cutting designs on velvet, comprising feed-rolls carrying the velvet, a plurality of cutters, electromagnets corresponding in number to the cutters and controlling the cutting operation, slides carrying the magnets and cutters, a cylinder having upon its face a design in relief, contact-tools corresponding in number to the cutters and arranged to close the circuit through the magnets, a slide carrying the tools in contact with the face of the design, a drive-shaft, cranks driven thereby, angle-levers having one arm adjustably connected with the crank, rods connecting the other end of the angle-levers and the slides, a worm-shaft connecting the feed-rolls, another worm-shaft connected with the design-cylinder, ratchet-wheels carried by the worm-shafts, pawls carried by levers and arranged to operate the ratchets, a cam arranged to be driven during a portion of each revolution of the drive-shaft, and independently-adjustable connections between the pawl-levers and cam, whereby the intermittent movement of the feed-rolls and design-cylinder may be independently regulated and the extent of reciprocation of the slides may be varied independently, in combination with an electric circuit through the tools and electromagnets whereby the passage of the contact-tools over the face of the design will operate to intermittently transfer the design to the velvet reduced or amplified at will.

21. A machine for cutting designs on velvet, comprising feed-rolls carrying the velvet, a plurality of rotary cutters arranged in approximately the same plane, bearings for the cutters, a frame adjustably supporting the bearings, an arm engaging the bearings and pivotally mounted at one end of the frame, a set-screw for displacing the other end of the arm, a slide carrying the frame and cutters, electromagnets carried by the slide and corresponding in number to the cutters, spring-pressed reciprocating needles arranged adjacent to the cutters and serving to present the uncut pile thereto, levers having one arm bearing against the needles, a wedge-surface carried by the armature of each magnet and arranged to engage the other arm of the levers, a cylinder having upon its surface a design in relief, contact-tools corresponding in number to the magnets and cutters, a slide carrying the tools in contact with the face of the design, rods extending parallel with the line of travel of the two slides, contact conductor-arms connecting each of the tools with a rod, contact collector-arms connecting each of the rods with a magnet, and an electric circuit through the design-cylinder, tools, arms, rods and magnets, whereby the passage of the tools over the face of the design will intermittently cause the reciprocation of the needles and transfer the design to the velvet, in combination with a drive-shaft, cranks driven thereby, angle-levers having one arm adjustably connected with the crank, a connection between the other end of the angle-levers and the slides, a worm-shaft geared to the feed-rolls, another worm-shaft geared with the design-cylinder, ratchet-wheels carried by the worm-shafts, pawls carried by levers and arranged to operate the ratchets, a cam arranged to be driven during a portion of each revolution of the drive-shaft, and independently-adjustable connections between the pawl-levers and the cam, whereby the feed-rolls and design-cylinder will be given an adjustable step-by-step rotary movement and the slides will be adjustably reciprocated and the transferred design reduced or amplified at will.

In testimony whereof I have signed this specification in the presence of two subscribing witnesses.

JEAN FRANCOIS MARIEN RIFFARD.

Witnesses:
 JOSEPH CHÉNET,
 HASTINGS BURROUGHS.